United States Patent
Kojima et al.

[11] Patent Number: 5,986,994
[45] Date of Patent: Nov. 16, 1999

[54] LIGHT PICKUP OF THIN TYPE

[75] Inventors: Kouki Kojima, Fukuoka; Fuminobu Furukawa, Onojo, both of Japan

[73] Assignee: Matsushita Electric Industrial Co., Ltd., Osaka, Japan

[21] Appl. No.: 08/989,897

[22] Filed: Dec. 12, 1997

[30]  Foreign Application Priority Data

Dec. 16, 1996  [JP]  Japan ................................... 8-335354

[51] Int. Cl.⁶ ..................................................... G11B 7/00
[52] U.S. Cl. ........................................... 369/112; 369/121
[58] Field of Search ................................. 369/54, 58, 94, 369/109, 110, 112, 100, 118, 121

[56]  References Cited

U.S. PATENT DOCUMENTS

| | | | |
|---|---|---|---|
| 5,661,711 | 8/1997 | Tanaka et al. | 369/54 X |
| 5,696,749 | 12/1997 | Brazas, Jr. et al. | 369/109 |
| 5,777,970 | 7/1998 | Kajiyama et al. | 369/94 |

FOREIGN PATENT DOCUMENTS 855363  2/1996  Japan .

*Primary Examiner*—Paul W. Huber
*Attorney, Agent, or Firm*—Stevens, Davis, Miller & Mosher, L.L.P.

[57]  ABSTRACT

An optical pickup is disclosed which is capable of recording or reproducing information from optical disks having different recording densities and includes a first optical unit having a light source which emits rays having a first wavelength for DVDs and a first light sensor which detects reflected rays, a second optical unit having a light source which emits rays having a second wavelength for CDs and a second light sensor which detects reflected rays, a beam splitter which directs the rays having the first wavelength and the rays having the second wavelength along substantially the same optical axis, and directs reflected rays from an optical disk to the first light sensor and the second light sensor, and an objective lens which has a numerical aperture (NA) of 0.6 or more, a focal length of 2.5 mm or less, an effective diameter of incidence of 3.0 mm or less and a working distance of 1.2 mm or less. The light pickup as a whole has a thickness of 7.5 mm or less as measured from a bottom surface of the optical disk. The light pickup is capable of reproducing information from optical disks having different recording densities, is composed of a small number of parts, and is compact and thin.

33 Claims, 10 Drawing Sheets

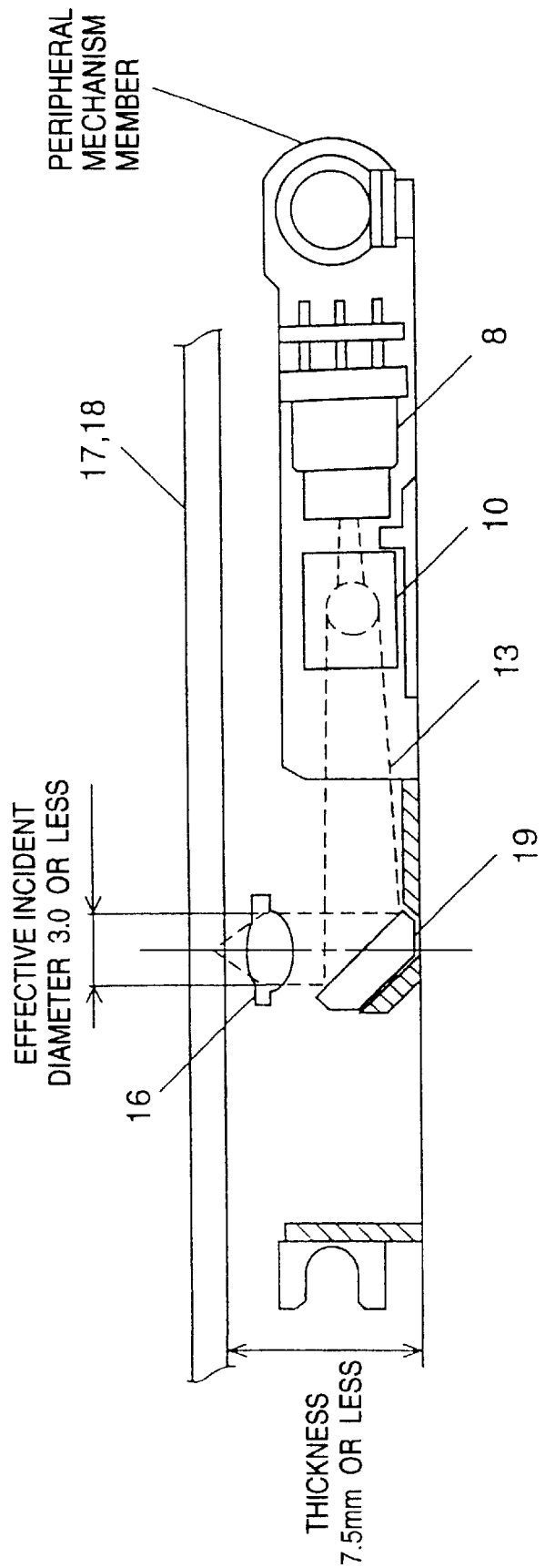

LIGHT PICKUP OF THIN TYPE

BACKGROUND OF THE INVENTION

1. Field of the Invention

The present invention relates to a light pickup which is used for recording or reproducing information from recording media having different recording densities such as high density optical disks, compact disks and so on.

2. Description of the Related Art

A conventional light pickup for recording and reproducing information from high density optical disks and low density optical disks will be described below. For descriptive convenience, a DVD (digital video disk) and a CD (compact disk) are taken as examples of the high density optical disks and the low density optical disks.

FIGS. 11A and 11B, respectively, are a plan view of the conventional light pickup and a sectional view illustrating main components thereof. In FIGS. 11A and 11B, the reference numeral 50 represents a light pickup for high density optical disks wherein an objective lens 54 for a high density optical disk which condenses a laser beam 53 onto a high density optical disk 52 is cemented and fixed to an objective lens holding cylinder 51. Further, a coil unit 55 which consists of a focus coil and a tracking coil for moving the objective lens holding cylinder 51 in a focusing direction and a tracking direction is cemented and fixed to the objective lens holding cylinder 51. On the other hand, the coil unit 55 is fitted in a permanent magnet and composes a magnetic circuit for driving the objective lens holding cylinder 51 in the focusing direction and the tracking direction. The objective lens holding cylinder 51 is held in a neutral position with an electrically conductive nonmagnetic linear elastic member 57 for supplying electric power to the coil unit 55. The objective lens for high density optical disk has a numerical aperture on the order of 0.6 and a focal length on the order of 3.3 mm.

Explanation will be made of an optical system of the light pickup 50 for high density optical disks which has the configuration described above. The reference numeral 61 designates an optical unit for high density optical disks which comprises a light emitting element and a light receiving element for the laser beam 53 having wavelengths of 635 to 650 nm. The laser beam 53 passes through a collimator lens 62, is made parallel, completely reflected by a surface of a raising mirror 63 coated with multiple layers and condensed by the objective lens 54 for high density optical disks, and forms an optical spot on the high density optical disk 52.

Then, the laser beam 53 which is reflected by the high density optical disk 52 is incident again onto the optical unit 61 for high density optical disks via the path in a direction reverse to that described above, allowed to pass through a diffraction grating (not shown) and received by a light receiving element (not shown). On the basis of optical information which is subjected to photoelectric conversion by the light receiving element, a focus is detected by the known hologram Foutcault and a track is detected by the phase difference method. The objective lens 54 for high density optical disks is always focused on the high density optical disk 52 and controlled so as to follow an information track as described above.

The high density optical disk (DVD) 52 is rotatingly driven by a spindle motor 71.

Then, description will be made of a light pickup for low density optical disks (CD). The reference numeral 70 represents a light pickup for the low density optical disks, which will not be described in particular since it is has a configuration and function which are similar to those of the light pickup 50 for high density optical disks. In an optical system of the light pickup for low density optical disks, the reference numeral 64 designates an optical unit for low density optical disks which comprises a light emitting element and a light receiving element for a laser beam 65 which has a wavelength of 780 nm. The laser beam 65 is completely reflected by a surface of a raising mirror 66, condensed by an objective lens 67 for low density optical disks and forms an optical spot on a low density optical disk 68.

Then, the laser beam 65 which is reflected from the low density optical disk 68 is incident again on the optical unit 64 for low density optical disks via the path in a direction reverse to that described above, allowed to pass through the diffraction grating and received by the light receiving element. On the basis of optical information which is subjected to photoelectric conversion by the light receiving element, a focus is detected by the known hologram Foucault method and a track is detected by the three-beam method. The objective lens 67 for low density optical disks is always focused on the low density optical disk 68 and controlled so as to follow an information track.

The conventional light pickup is configured so as to be capable of recording or reproducing information from an optical disk with the light pickup 50 for high density optical disks and the light pickup 70 for low density optical disks which are composed independently and separately as described above.

However, the conventional light pickup which has the configuration described above poses a problem that it requires a large number of parts, and makes it difficult to configure the light pickups more small-sized and thinner since the light pickup uses two independent optical systems for the light pickup for high density optical disks and the light pickup for low density optical disks. Further, working distances of the two objective lenses described above may be set at 1.5 mm or longer dependently for the sake of optical characteristics and focus control thereof and such long working distances constitute a hindrance to more small-sized configuration of the light pickups.

A primary object of the present invention is to provide a light pickup which is capable of recording or reproducing information from optical disks having different recording densities, and configured to be compact and thin.

SUMMARY OF THE INVENTION

The light pickup according to the present invention is characterized in that it comprises a first light source which emits rays having a first wavelength for DVDs, a first optical sensor which detects reflected rays from an optical disk, a second light source which emits rays having a second wavelength for CDs, a second optical sensor which detects reflected rays from an optical disk, optical path modifying means which directs the rays having the first wavelength and the rays having the second wavelength along substantially the same optical axis, and directs the reflected rays from the optical disk to the first light sensor and the second light sensor, and an objective lens which has a numerical aperture (NA) of 0.6 or more and a focal length of 2.5 mm or less for the rays having the first wavelength, and focuses the rays having the first wavelength and the rays having the second wavelength onto the optical disk, that the objective lens has an effective diameter of incidence of 3.0 mm or less and a working distance of 1.2 mm or less, and that the light pickup as a whole has thickness of 7.5 mm or less as measured from a bottom surface of the optical disk.

Further, by setting the refractive characteristic of the objective lens and the effective diameters of incidence of the rays properly the light pickup according to the present invention can have a working distance of 1.4 mm or less for the rays having the first wavelength and a working distance of 1.2 mm or less for the rays having the second wavelength.

By selecting the configuration described above, it is possible to provide a light pickup which is capable of recording or reproducing information from optical disks having different recording densities, composed of a small number of parts, and compact and thin.

BRIEF DESCRIPTION OF THE DRAWINGS

FIG. 2 is a sectional view taken along a II—II line in FIG. 1;

DESCRIPTION OF THE PREFERRED EMBODIMENTS

Figure 1:
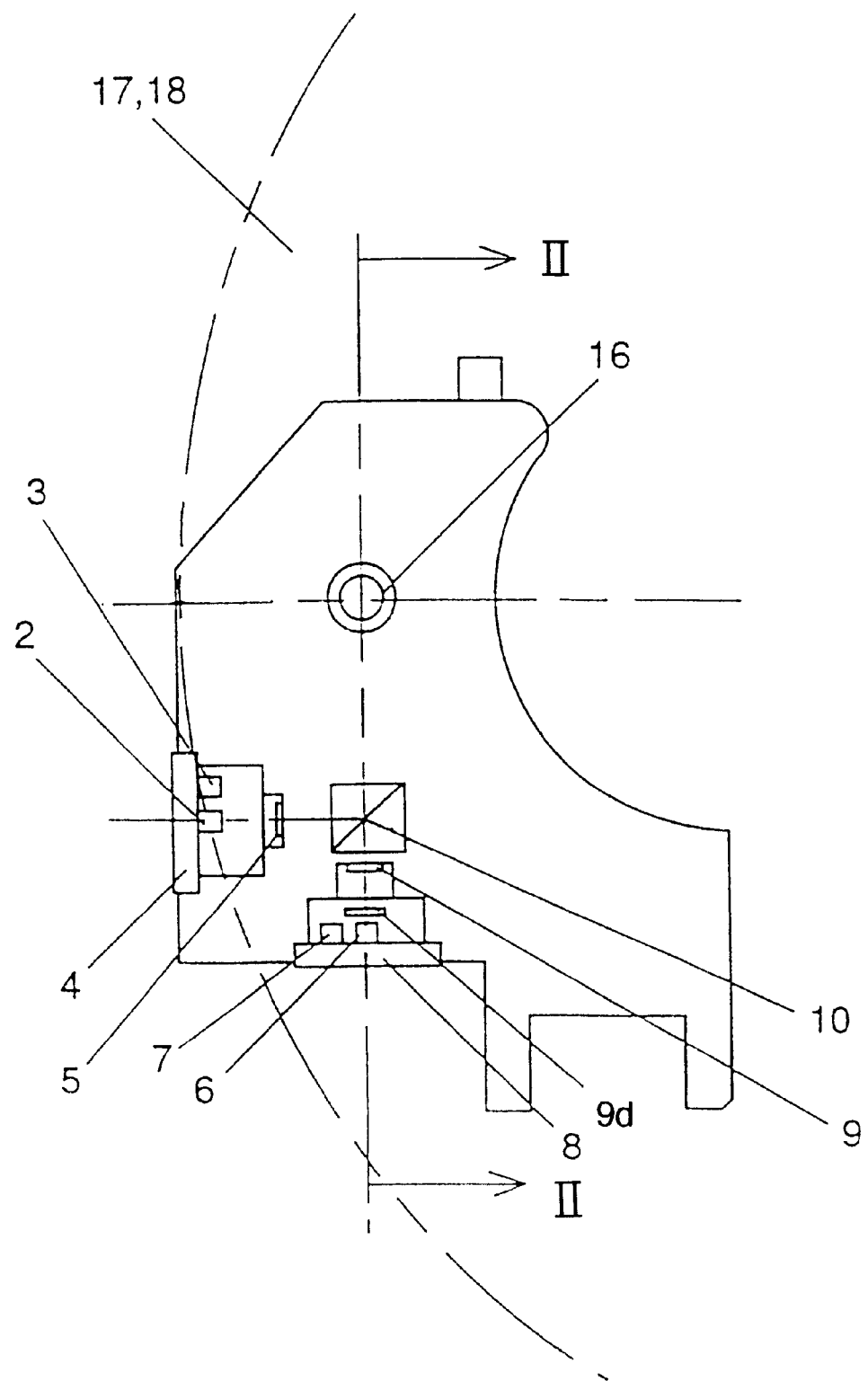
FIG. 1 is a diagram illustrating a configuration of a first embodiment of the light pickup according to the present invention.

A first embodiment of the present invention will be described with reference to the accompanying drawings. FIG. 1 shows a configuration of a light pickup in the first embodiment of the present invention. In FIG. 1, the reference numeral 4 represents an optical unit. The optical unit 4 is composed of a light source 2 emitting rays for high density optical disks, a light receiving element 3 for receiving rays reflected by a high density optical disk, etc. which are mounted on a base plate, a side wall formed as an optical path which surrounds these members, a light outgoing section formed as an open window and so on.

It is preferable that the light source 2 has an oscillating wavelength of 800 nm or less so that a beam spot formed by the rays which are emitted from the light source and converged onto a recording medium can easily be adjusted to a size on the order of a pitch of a track formed on the recording medium. When the light source is to be used for recording and reproducing information from high density optical disks in particular, it is further preferable that the light source has an oscillating wavelength of 650 nm or less since such a light source can form a beam spot small enough to reproduce information recorded at very high densities on recording media, thereby making it possible to easily obtain storage means having large capacities. On a premise that the light source is to be used for reproducing information from DVDs, the first embodiment uses a light source which has wavelengths on the order of 600 to 680 nm, or within a range from 630 to 660 nm in particular.

An optical member 5 is cemented to a light outgoing section of the optical unit 4. This optical member 5 has a role to direct rays emitted from the light source 2 and reflected by a recording medium to a predetermined location of the light receiving element 3. In this embodiment, returning rays are directed with a diffraction grating 5a formed on the optical member 5.

The optical member 5 is formed of a transparent plate-like member, and a diffraction grating 5a (FIG. 3a) for dividing an optical path is formed on at least one of the surfaces which intersect nearly perpendicularly an optical axis of outgoing rays. It is preferable that the optical member 5 as a whole is formed as a plane parallel plate so that it can prevent generation of aberrations, thereby favorably reproducing signals or forming tracking signals. Further, it is possible to prevent generation of astigmatism and degradation of reproduced signals due to blurring of a beam spot by disposing the optical member 5 so that its top surface and bottom surface are accurately perpendicular to an optical axis of transmitting rays.

The reference numeral 8 represents an optical unit. The optical unit 8 comprises a light source 6 which emits rays for a low density optical disk and a light receiving element 7 which receives rays reflected by the low density optical disk, etc. mounted on a base plate, a side wall disposed so as to surround these members and so on. Differences between the optical unit 8 and the optical 4 unit 4 will be described below.

It is preferable that the light source 6 has an oscillation wavelength of 800 nm or less so that a beam spot formed with rays emitted from the light source and converged onto a recording medium can easily be adjusted to a size on the order of a pitch of tracks formed on the recording medium. A light source having an oscillating wavelength longer than that of the light source 2 can be used as the light source 6 and when information on a CD is to be reproduced, for example, a light source having an oscillating wavelength on the order of 780 nm can form a beam spot having a sufficient size on the low density optical disk.

An optical member 9 is constituted in a similar manner to that of the optical member 5. However, a diffraction grating 9a (FIG. 3b) formed on the optical member 9 may be different from the diffraction grating 5a in a certain case and will be described below. An arrangement of the light receiving sections on the light receiving element 7 is often different from the arrangement of the light receiving sections on the light receiving element 3. When a focus error signal, etc. are to be generated by the diffraction grating 9a at a stage to direct rays from an optical disk to the light receiving element 7, it is preferable to configure the diffraction grating 9a so that it has a shape which is different from that of the diffraction grating 5a and generates signals optimum for individual optical disks, thereby making it possible to obtain a highly reliable light pickup which can perform more accurate signal generation and operation control with less errors.

When a tracking control is to be performed in particular by the three-beam method, a diffraction grating is disposed as a beam generating section 9d on the light source side of the optical member 9. The beam generating section 9d is disposed at a location where it permits the outgoing rays to transmit therethrough, and it is clear of an optical path for rays which are reflected by the disk, diffracted by the diffraction grating 9a and travel toward the light receiving element 7.

The light pickup according to the first embodiment using the two light sources as described above has excellent characteristics described below. That is, the light pickup is capable of forming beam spots which are suited for different kinds of recording media as described above. Further, the light pickup is capable of setting wavelengths of the light sources at levels matched with recording characteristics of the recording media. Furthermore, the light pickup allows setting of effective diameters of incidence of the objective lens and the rays so that the rays are focused on information recording layer depths in the DVD and CD in the above example which have different depths as measured from the bottom surfaces.

The reference numeral 10 represents a beam splitter which acts to direct two laser beams from the optical unit 4 and the optical unit 8 to the optical disk, and to direct reflected rays from the optical disk to the light receiving elements 3 and the light receiving element 7. The beam splitter 10 has such properties as to reflect the rays from the optical unit 4 at a high ratio and transmit the rays from the optical unit 8 at a high ratio.

The reference numeral 16 designates an objective lens which is usable for recording or reproducing information commonly on the high density optical disk and low high density optical disk. This objective lens has a numerical aperture of 0.6 or more which is required for recording or reproducing information from the high density optical disk (i.e., for rays having the wavelength of the light source 2) and a focal length of 2.5 mm or less for the high density optical disk or a working distance (a distance as measured from an outgoing side end surface of the objective lens 16 to the bottom surface of the optical disk: this applies also to the following description) of 1.2 mm or less for the high density optical disk. A light bundle incident on the objective lens 16 for recording or reproducing the information from the optical disk must have a diameter two times or more than a product of the numerical aperture multiplied by the focal length (a distance as measured from a center of the objective lens to a focal point thereof when parallel rays are incident onto a side surface of the objective lens and rays outgoing from the other side surface are focused: this applies also to the following description). The diameter of the light bundle directly contributes directly to dimensions of the light pickup. Accordingly, the diameter of the light bundle is a factor which specifies sizes of optical parts and determines dimensions of the light pickup. Speaking concretely, a shorter focal length of the objective lens is more preferable for configuring the light pickup more small-sized and thinner. Further, the working distance is a factor which restricts a height of the light pickup and a shorter working distance is more preferable for configuring the light pickup thinner. Furthermore, it is preferable in terms of a humidity resistance characteristics to select glass as a material for the objective lens though it may be made of a glass or plastic material.

Description will be made of an arrangement of the optical systems in the first embodiment of the present invention. The optical unit 4 and the optical unit 8 are arranged so that their optical axes intersect at an angle of nearly 90° at the beam splitter 10. The optical unit 8 is disposed nearly in parallel with an optical axis of rays which travel from the beam splitter 10 to the objective lens 16, whereas the optical unit 4 is disposed nearly perpendicularly to an optical axis for the rays which travel from the beam splitter 10 to the objective lens 16. When a length of an optical path from the light source of the optical unit 4 to the objective lens 16 is represented by L1 and a length of an optical path from the optical unit 8 to the objective lens 16 is designated by L2, the optical units 4 and 8 are arranged so as to satisfy the relationship of L1>L2.

FIG. 2 is a sectional view taken along a II—II line in FIG. 1 which is descriptive of thicknesses of the components described above. In FIG. 2, the reference numeral 13 represents a light beam, or a locus of rays which are emitted from the optical unit 4 or the optical unit 8. The reference numeral 19 designates an erecting mirror which reflects the light beam 13 so as to align the same with the optical axis of the objective lens 16.

The objective lens 16 is set to have the focal length of 2.5 mm or less and the working distance of 1.2 mm or less for the high density optical disk, and the optical units 4 and 8 are arranged so as to satisfy the relationship of L1>L2 as described above. Since rays emitted from the light sources 2 and 6 are divergent, rays are most divergent when they are incident on the objective lens 16 in the arrangement described above. For configuring the light pickup as a whole so as to have a desired size and thickness, an effective diameter of incidence of a light bundle which transmits through the objective lens 16 (a maximum diameter of a condensing function of the objective lens 16, i.e., a value a little larger than 2×NA×f (focal length): this applies also to the following description) is set at 3.0 mm or less in the embodiment (a finite optical system). As a result, it is possible to specify the thickness of an entire light pickup system including peripherical mechanical components for supporting the optical elements and constitute the entire system so as to have a thickness of 7.5 mm or less as measured from a bottom surface of the high density optical disk 17.

Figure 3A:
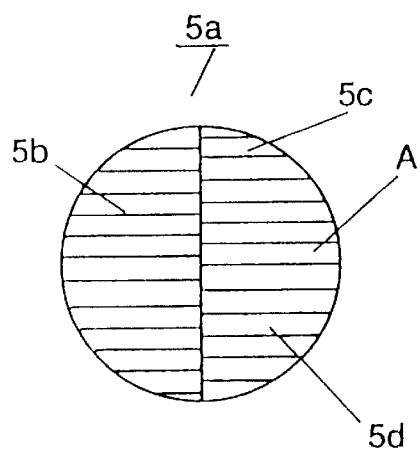
FIGS. 3A and 3B are diagrams illustrating a shape of a diffraction grating used in the first embodiment of the present invention.
Figure 3B:
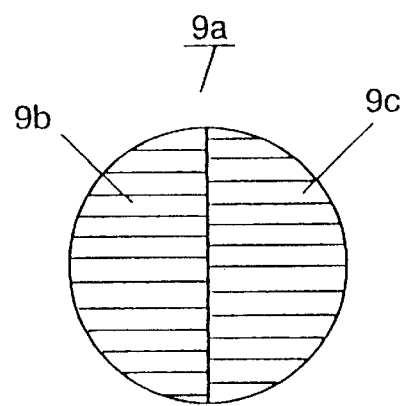

Now, shapes of the diffraction grating 5a and the diffraction grating 9a which are disposed on the optical unit 4 and the optical unit 8, and configurations of the light receiving elements will be described with reference to FIGS. 3A, 3B and FIGS. 4A, 4B. FIGS. 3A and 3B show the shapes of the diffraction gratings used in the first embodiment of the present invention, whereas FIGS. 4A and 4B show the configurations of the light receiving elements used in the first embodiment of the present invention.

The diffraction grating 5a shown in FIG. 3A corresponds to the optical unit 4, and has three divided sections 5b, 5c and 5d as shown in the drawing. Further, the diffraction grating 9a shown in FIG. 3B corresponds to the optical unit 8, and has two divided sections 9b and 9c as shown in the drawing.

Figure 4A:
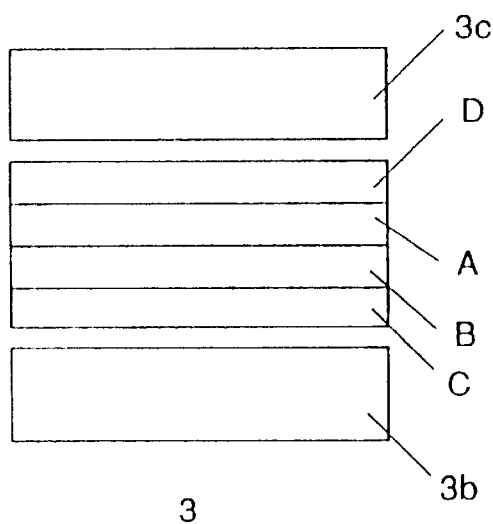
FIGS. 4A and 4B are diagram illustrating a configuration of a light receiving element used in the first embodiment of the present invention.
Figure 4B:
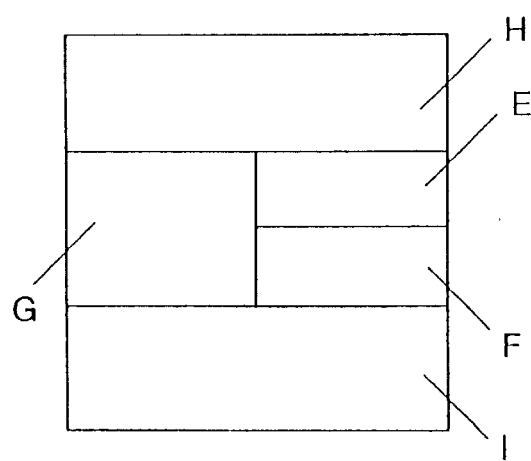

In FIGS. 4A and 4B, a light receiving element is disposed on a base plate of the optical unit 4 so as to form four divided light receiving sections at a center and two light receiving sections on each sides of the four divided light receiving sections, whereas a light receiving element is disposed on a base plate of the optical unit 8 so as to form five divided light receiving sections.

It is preferable to orient the optical unit 4 such that a division line A which completely divides a semicircular section of the diffraction grating 5a into two halves is nearly perpendicular to a radial direction of the high density optical disk and mount the light source 2 in such a direction that a longitudinal direction of a far field pattern of outgoing rays is in parallel with the radial direction of the high density optical disk.

Now, description will be made of reproducing operations of the light pickup which has the configuration explained above. In this embodiment, a compact disk (hereinafter referred to as a CD) is used as the low density optical disk and a digital video disk (hereinafter referred to as a DVD) is used as the high density optical disk.

First, operations for reproducing information from a DVD will be described. Rays outgoing from the light source 2 with an oscillating wavelength of 635 to 650 nm transmit through the diffraction grating 5a to be incident onto the beam splitter 10. At least 90% of the incident rays is reflected by the beam splitter 10 to outgo from the beam splitter 10 with an optical axis thereof bent approximately 90 degrees. The outgoing rays are incident on the objective lens 16 to form an image on a DVD 17 owing to a condensing function of the objective lens 16. Rays reflected by the DVD 17 are reflected by the beam splitter 10 after transmitting again through the objective lens 16 to be incident on the diffraction grating with an optical axis thereof bent toward the optical unit 4. The rays incident on the diffraction grating are diffracted by the three divided regions 5b, 5c and 5d to be incident on the light receiving sections formed on the light receiving element 3.

Now, description will be made of a relationship between the rays diffracted by the diffraction grating 5a and the rays incident on the light receiving element 3. The rays diffracted by the diffraction grating 5b (primary diffracted rays) are incident on a light receiving section formed on the light receiving element 3. This light receiving section is divided into four sections so as to form regions A, B, C and D. Rays incident on the regions 5c and 5d are incident on the light receiving sections 3b and 3c of the light receiving element 3. Description will be made of methods for generating various kinds of signals from the rays incident as described above. First, an RF signal is generated by photoelectrically converting the rays incident on the light receiving sections 3a, 3b and 3c formed on the light receiving element, converting current signals obtained by the photoelectric conversion into voltage signals, and totalizing the voltage signals.

Then, the so-called hologram Foucault method is used to form a focus error signal from a differential output between a sum signal in the regions A and C formed on the light receiving element and a sum signal in the regions B and D. On the basis of this focus error signal, an actuator which holds the objective lens 16 is operated in a focusing direction. Finally, a tracking error signal is generated by converting voltage signals from the light receiving sections 3b and 3c into digital waveforms by a comparator, and converting a pulse corresponding to a phase difference between the waveforms into an analog waveform through an integration circuit. On the basis of this tracking error signal, the actuator which holds the objective lens 16 is operated in a tracking direction.

Now, description will be made of operations for regenerating information from a CD. Rays emitted from the light source 6 with an oscillating wavelength of 770 to 790 nm are formed into three beams by the beam forming section 9b of the optical unit 8 to pass through the diffraction grating 9b to be incident on the beam splitter 10. At least 90% of the rays incident on the beam splitter 10 are allowed to transmit through the beam splitter 10 to outgo from the beam splitter 10 as it is, to be incident on the objective lens 16 to form an image on the CD 18 owing to the condensing function of the objective lens 16.

Subsequently, rays reflected by the CD 18 transmit again through the objective lens 16 and the beam splitter 10 to be incident on the diffraction grating 9. The rays incident on the diffraction grating 9 are diffracted by the two divided regions 9b and 9c to be incident on five divided regions E, F, G, H and I formed on the light receiving element.

Description will be made of methods for generating various kinds of signals from the rays incident as described above. An RF signal is generated by photoelectrically converting the rays incident on the light receiving sections E, F and G formed on the light receiving element 7, converting current signals obtained by the photoelectric conversion into voltage signals, and totalizing the voltage signals. Then, the so-called hologram Foucault method is used to form a focus error signal from a differential output between signals from the regions E and F formed on the light receiving element 7. On the basis of this focus error signal, the actuator which holds the objective lens 16 is operated in the focus direction. Finally, a tracking error signal is generated by the so-called three beam method. On the basis of this tracking error signal, the actuator which holds the objective lens 16 is operated in the tracking direction.

The configuration described as the first embodiment is not limiting, and the locations of the optical unit 4 and the optical unit 8, for example, may be exchanged with each other. Though the light source which emits the rays having the wavelengths in the vicinities of 650 nm is used for reproducing information from the high density optical disk and the light source which emits the rays having the wavelengths in the vicinities of 780 nm is used for reproducing the information from the low density optical disk in the first embodiment, the present invention is not limited to these light sources, and a light source of 650 nm and a light source of 400 nm, for example, may be used for the low density optical disk and the high density optical disk, respectively. Erecting mirrors which reflect rays having wavelengths of 635 to 650 nm and rays having wavelength of 780 nm may be disposed in an optical path between a wavelength filter 15 (see FIG. 5) and the objective lens 16. Further, a deflecting beam splitter which reflects an S deflected component of a laser beam having wavelengths of 635 to 650 nm and transmits therethrough a P deflected component of a laser beam having a wavelength of 780 nm may be used in place of the beam splitter 10. Furthermore, the laser beam of the optical unit may be changed into a laser beam having a short wavelength corresponding to recording or reproduction of information from the high density optical disk.

As understood from the foregoing detailed description, the present invention specifies a working distance of 1.2 mm or less. As a result, an effective diameter of incidence of the objective lens 16 which is determined in conjunction with a numerical aperture can be set at 3.0 mm or less. This effective diameter makes it possible to specify a size and a diameter of the objective lens, thereby remarkably contributing to small-sizing and weight reduction of a light pickup.

When the effective diameter of incidence of the objective lens 16 is specified, it is additionally possible to specify a maximum diameter of a finite optical system (since a maximum diameter of divergent rays is the effective diameter of incidence of the objective lens 16). Accordingly, it is possible to reserve a maximum space for a light bundle which passes through the objective lens while reserving spaces for parts of a driving system. Moreover, the light pickup as a whole can be made 7.5 mm or less thick (a thickness of the light pickup as a whole as measured from a bottom surface of the optical disk and including the working distance described above). When the light pickup is configured to have a thickness of 7.5 mm or less as described above, a disk system as a whole including a tray section for accommodation/discharge of the light pickup can be made 12.7 mm (½ inch) or less thick, thereby providing a light pickup which is small-sized, lightweight and usable in various apparatus.

Figure 5:
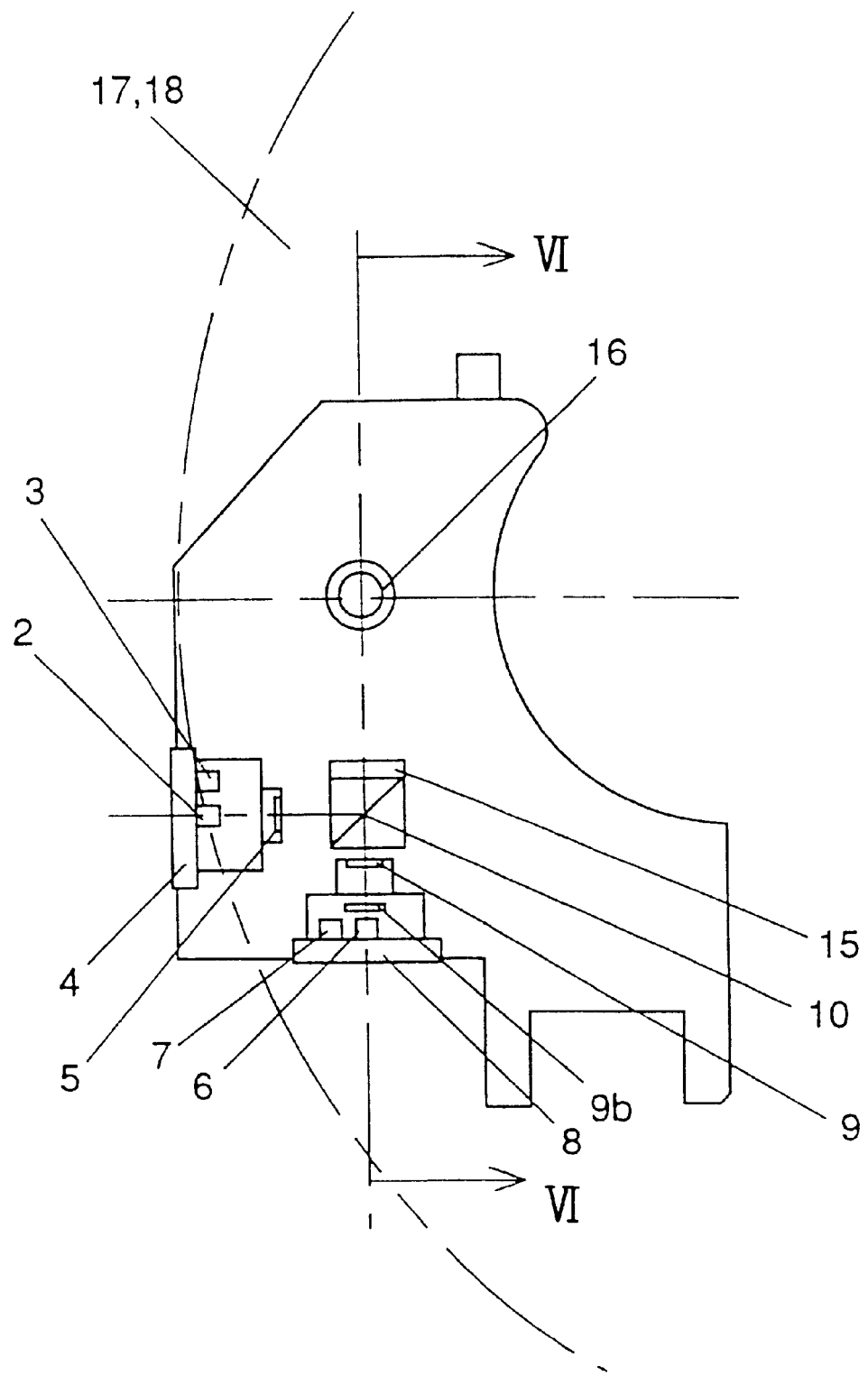
FIG. 5 is a diagram illustrating a configuration of a second embodiment of the light pickup according to the present invention.

Then, a second embodiment of the present invention will be described with reference to FIG. 5. FIG. 5 shows a configuration of a light pickup according to the second embodiment of the present invention. In FIG. 5, the reference numerals 4 and 8 represent optical units, the reference numeral 10 designates a beam splitter and the reference numeral 16 denotes an objective lens. Since the components mentioned above are configured and arranged similarly to those used in the first embodiment, they will be designated by the same reference numerals and a detailed description thereof is omitted.

Differently from the first embodiment, the second embodiment comprises a wavelength filter 15. The wavelength filter 15 transmits therethrough rays emitted from a light source 2 and reflects or absorbs rays emitted from a light source 6. Accordingly, the wavelength filter 15 serves as a stop which restricts diameters of both light bundles emitted from the light source 2 and the light source 6.

From viewpoints of enhancement of productivity and cost reduction, it is remarkably preferable that the wavelength filter 15 is disposed between the beam splitter 10 and the objective lens 16 or between the optical unit 8 and the beam splitter 10, so that it is unnecessary to provide a plurality of filters in correspondence to the individual light sources, and a size of the wavelength filter 15 can be restricted to a minimum since it is disposed at a location where the light beam has not been further diverged. Such arrangement is most preferable in that the wavelength filter 15 is bonded and provided in a state of having been preliminarily positioned relative to the beam splitter 10, thereby making it possible to reduce a number of members being subjected to positioning at the time of assembly of the light pickup, enhance productivity of the light pickup, and minimize deviation between the optical axis of the rays and a center axis of the wavelength filter.

Figure 6:
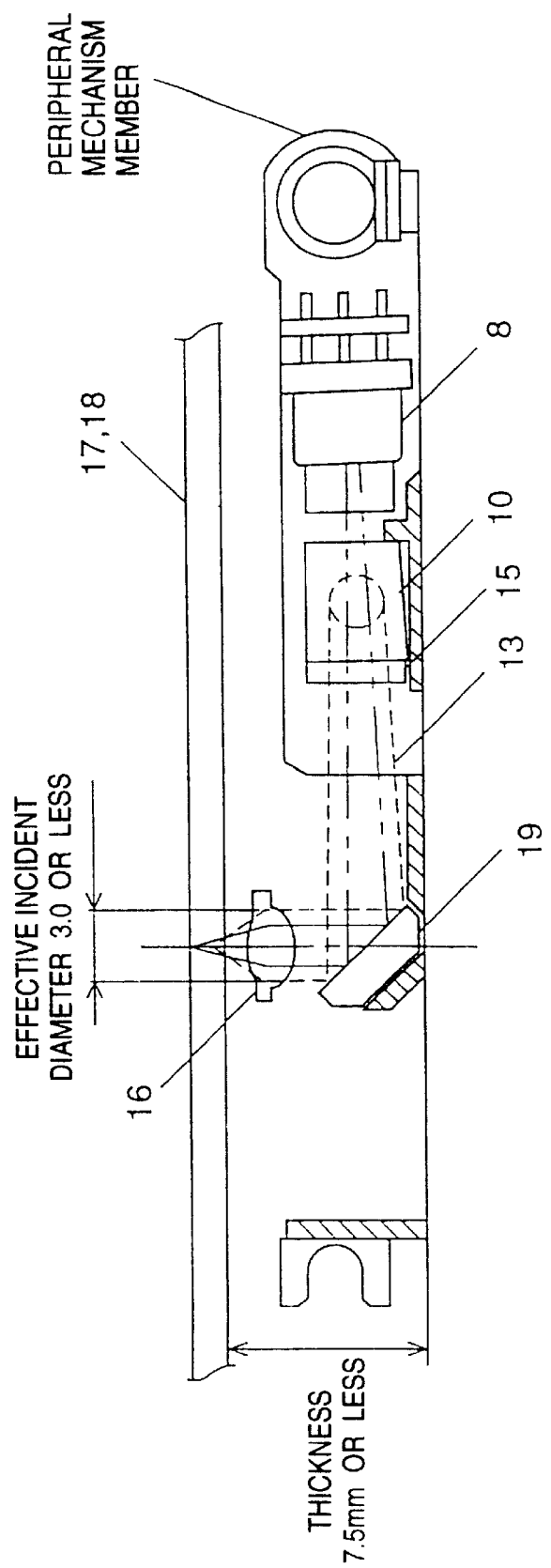
FIG. 6 is a sectional view taken along a VI—VI line in FIG. 5.

FIG. 6 is a sectional view taken along a VI—VI line in FIG. 5. In FIG. 6, the light beam 13 is narrowed in diameter by the wavelength filter 15 (indicated by two-dot chain lines in the drawing) when the light beam outgoes from the optical unit 8 toward a CD. When a light beam outgoes from the optical unit 4 (not shown) toward a DVD, it transmits through the wavelength filter 15 (indicated by dashed lines in the drawing). The light beams which are divergent light bundles from the two light sources are reflected by an erecting mirror 19 to be incident on the objective lens 16.

As already described with reference to the first embodiment, the objective lens 16 is set to have a focal length of 2.5 mm or less and a working distance of 1.2 mm or less for a high density optical disk 17, and the optical unit 4 and the optical unit 8 are disposed so as to satisfy the relationship of L1>L2. Since the light beams from the light sources 2 and 6 are divergent, the objective lens 16 is disposed at a location where the incident light beams are most divergent in the arrangement described above. For the sake of finishing a light pickup system as a whole to a desired size and thickness, an effective diameter of light beams transmitting through the objective lens 16 is set at 3.0 mm or less also in the second embodiment (a finite optical system). As a result, it is possible to reserve a maximum space for the light bundles which transmit therethrough while reserving spaces for parts of a driving system. Moreover, it is possible to specify a thickness of the light pickup system as a whole including peripheral members for supporting the optical elements described above and constitute the entire light pickup system with a thickness of 7.5 mm or less as measured from a bottom surface of the high density optical disk 17.

The configuration of the second embodiment described above is not limiting. For example, in place of the wavelength filter 15, a stop member (not shown) may be provided between the optical unit 8 and the beam splitter 10 to have an aperture having such a diameter as to operate the objective lens 16 within a range of numerical apertures (NAs) from 0.4 to 0.6 for rays from the objective lens 16.

Further, the locations of the optical unit 4 and the optical unit 8 may be exchanged with each other, and different wavelengths may be selected.

Figure 7:
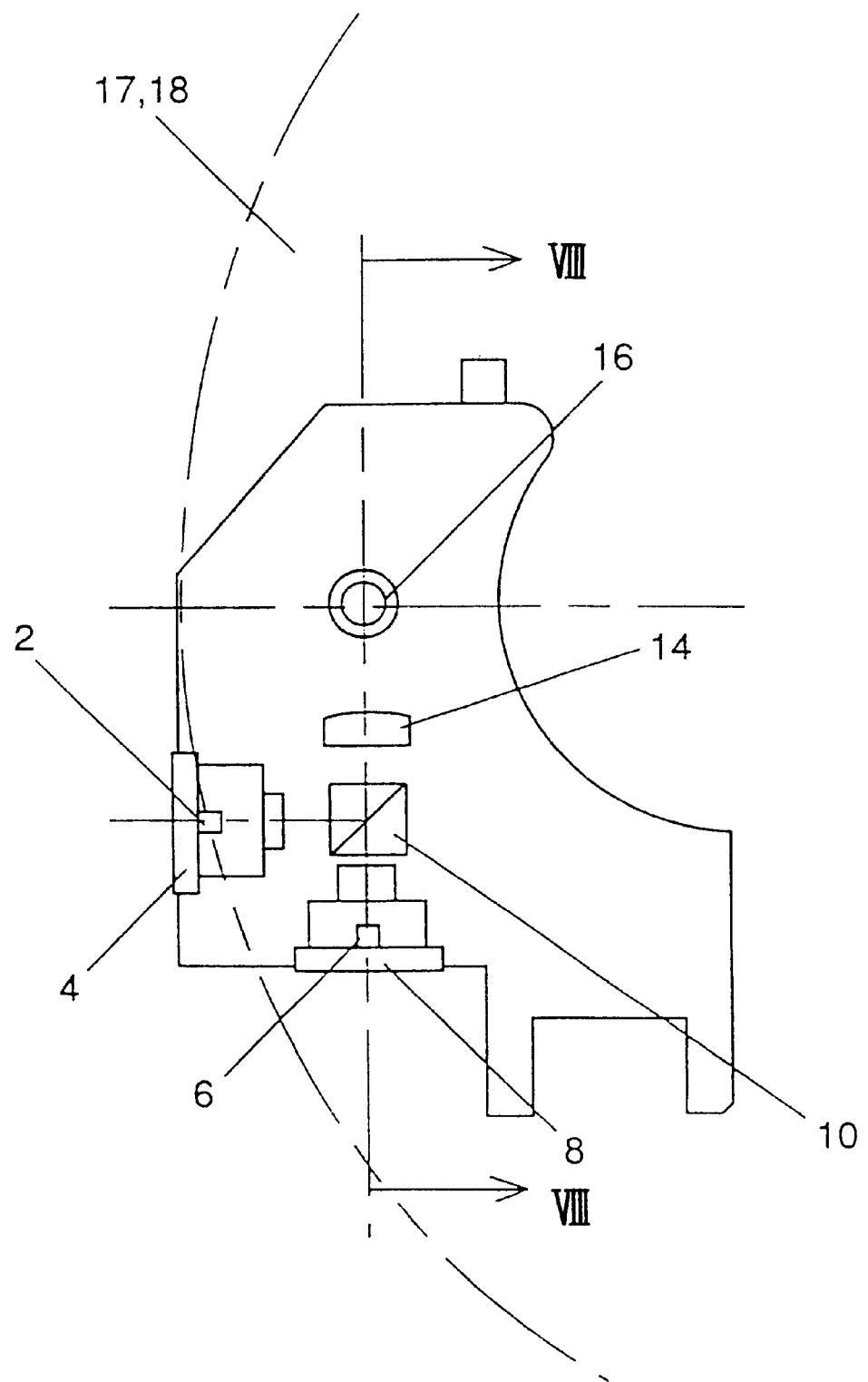
FIG. 7 is a diagram illustrating a configuration of a third embodiment of the light pickup according to the present invention.

Then, a third embodiment of the present invention will be described with reference to FIG. 7. FIG. 7 shows a configuration of a light pickup according to the third embodiment of the present invention. In FIG. 7, reference numerals 4 and 8 represent optical units, the reference numeral 10 designates a beam splitter and the reference numeral 16 denotes an objective lens. Since the components mentioned above are configured and disposed similarly to those used in the first embodiment, they will be designated by the same reference numerals and not described in detail.

Differently from the first embodiment, the third embodiment comprises a collimator lens 14. The collimator lens 14 has a focal length within a range from 11 to 18 mm and a numerical aperture within a range from 0.1 to 0.14. The collimator lens 14 is disposed between a ray outgoing surface of the beam splitter 10 and the objective lens 16. The positional relationship between the collimator lens 14 and light source shown in FIG. 7 is such that a light source 2 is disposed at a distance of a focal length of the collimator lens 14 whereas a light source 6 is disposed at a distance shorter than the focal length of the collimator lens 14. In other words, the optical units 4 and 8 are disposed so as to satisfy a relationship in optical paths of L1>L2 where a length of an optical path from the light source of the optical unit 4 to the collimator lens 14 is represented by L1 and a length of an optical path from the light source of the optical unit 8 to the collimator lens 14 is designated by L2. As a result, rays emitted from the light source 2 are parallel with one another after transmitting through the collimator lens 14, whereas rays emitted from the light source 6 are reduced in divergent angles after transmitting through the collimator lens 14.

Now, description will be made of information reproducing operations of the light pickup according to the third embodiment. Operations for reproducing information from a DVD will be described first. As in the first embodiment, the rays emitted from the light source 2 are incident on the beam splitter 10. At least 90% of the rays incident on the beam splitter 10 is reflected to outgo from the beam splitter 10 with an optical axis bent at an angle of approximately 90 degrees. The rays are incident on the collimator lens 14, converted by the collimator lens 14 from divergent rays into parallel rays, and are incident on the objective lens 16 to form an image on a recorded data layer of a DVD 17 owing to a condensing function of the objective lens 16.

Rays reflected by the DVD 17 are reflected by the beam splitter 10 after transmitting again through the objective lens 16 and the collimator lens 14, to be incident on the optical unit 4 with an optical axis bent toward the optical unit 4. After the rays are incident on the optical unit 4, light receiving sections operate to detect and reproduce signals as in the first embodiment.

Now, operations for reproducing information from a CD will be described. Rays emitted from the light source 6 are formed into three beams to be incident on the beam splitter 10. At least 90% of the rays incident on the beam splitter 10 is reflected by the beam splitter 10 to be incident on the collimator lens 14. The rays are converted by the collimator lens 14 into rays of reduced divergent angles to be incident on the objective lens 16 and form an image on the CD 18 owing to a condensing function of the objective lens 16.

Rays reflected by the CD 18 are incident on the optical unit 8 after transmitting again through the objective lens 16, the collimator lens 14 and the beam splitter 10. After the rays are incident on the optical unit 8, light receiving sections operate to detect and reproduce signals as in the first embodiment.

Figure 8:
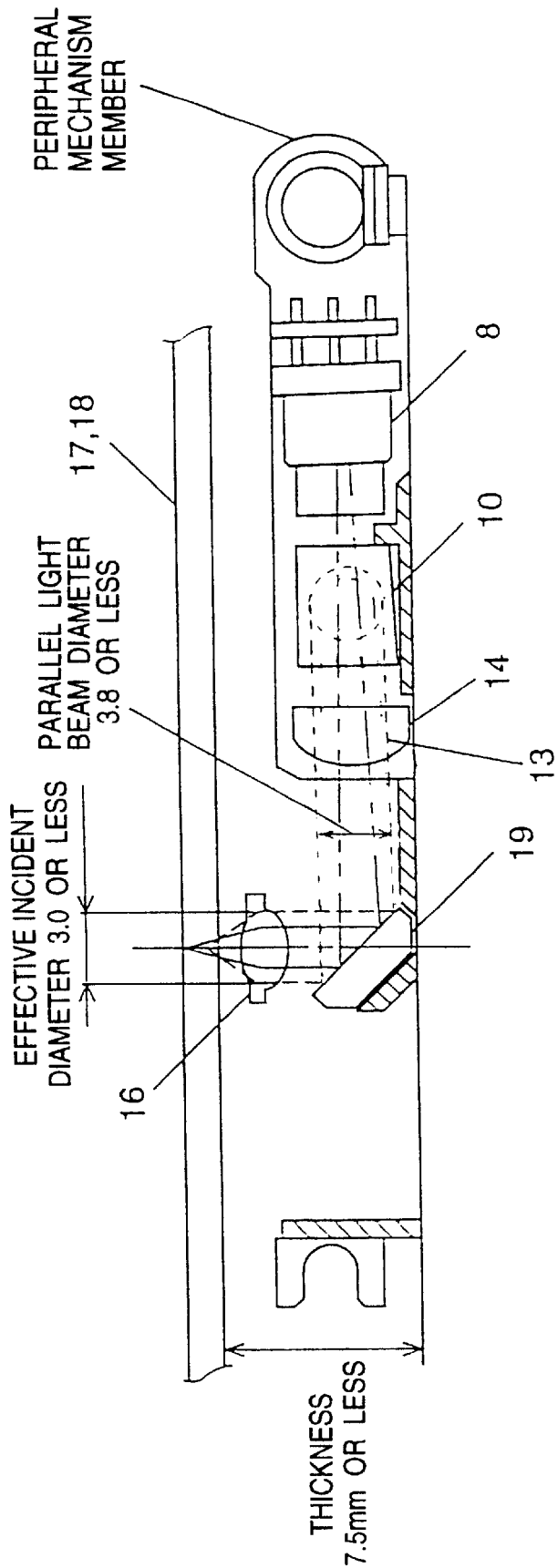
FIG. 8 is a sectional view taken along a VIII—VIII line in FIG. 7.

FIG. 8 is a sectional view taken along a VIII—VIII line in FIG. 7. In FIG. 8, a light beam 13 outgoing from the optical unit 8 toward the CD is reduced in a divergent angle by the collimator lens 14 (indicated by two-dot chain lines in the drawing). A light beam which emerges from the optical unit 4 (not shown) toward the DVD is converted by the collimator lens 14 from a divergent light beam into a parallel light beam (indicated by dashed lines in the drawing). Each of the light beams is reflected by an erecting mirror 19 to be incident on the objective lens 16.

As described with reference to the first embodiment, the objective lens is set to have a focal length of 2.5 mm or less and a working distance of 1.2 mm or less for the high density optical disk, and the optical units 4 and 8 are disposed so as to satisfy the relationship of L1>L2. Since the light beam emitted from the light source 2 or the light source 6 is converted by the collimator lens 14 into the parallel beam or reduced in divergent angle, the light beam 13 from the DVD which has just transmitted through the collimator lens 14 is made parallel to have a maximum diameter in the arrangement described above.

For the sake of finishing an entire light pickup system to a desired size and thickness, an effective diameter of incidence of a light bundle passing through the objective lens 16 is set at 3.0 mm or less and a diameter of a parallel light bundle outgoing from the collimator lens 14 is set at 3.8 mm or less also in the third embodiment (a finite optical system). As a result, the third embodiment permits specifying a thickness of the entire light pickup system including peripheral mechanical members for supporting the optical elements described above, thereby making it possible to constitute the entire system with a thickness of 7.5 mm or less as measured from a bottom surface of the high density optical disk 17.

The configuration described as the third embodiment is not limiting, and for example, a light source of 650 nm may be used for low density optical disks and a light source of 400 nm may be used for high density optical disks.

Figure 9:
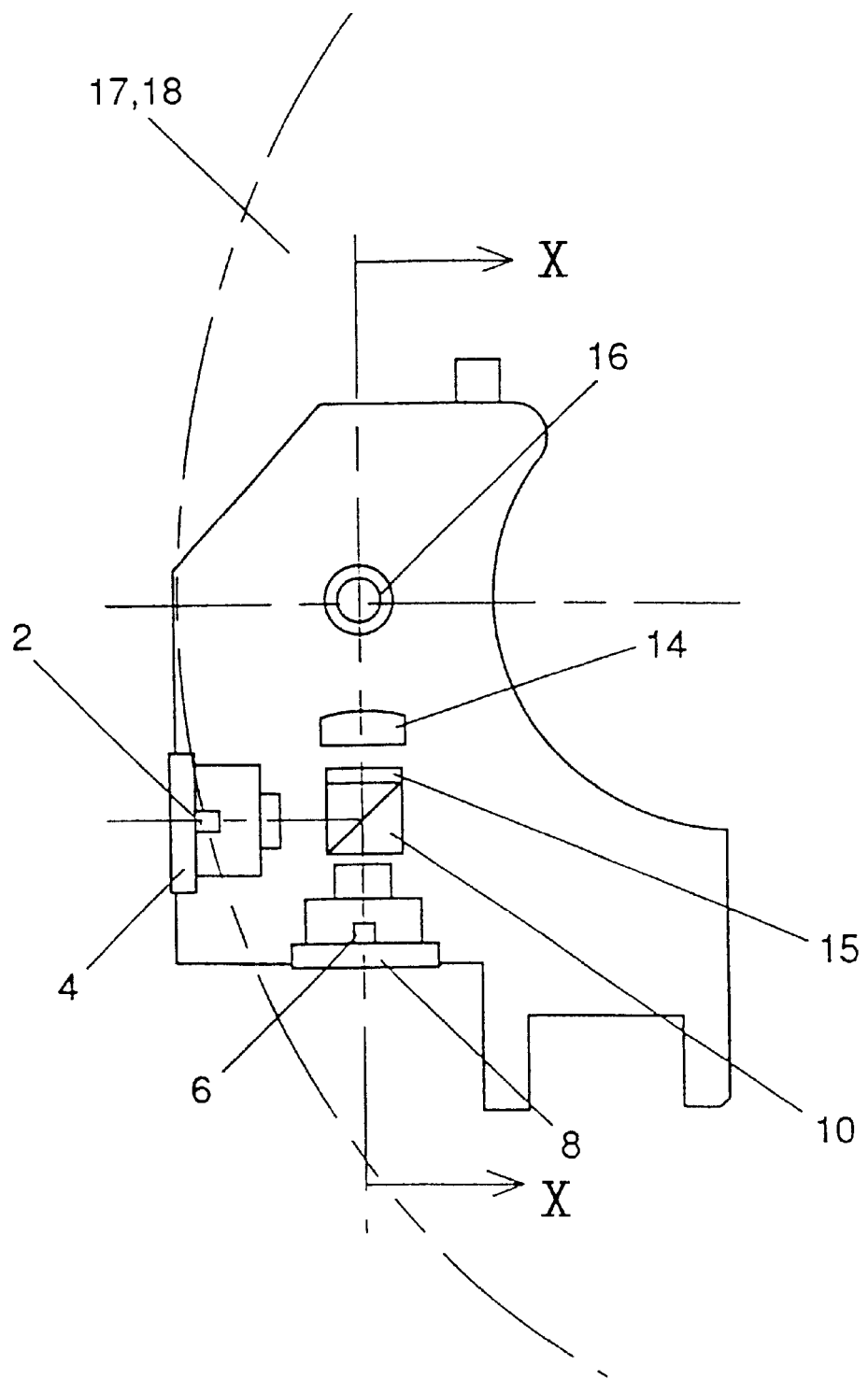
FIG. 9 is a diagram illustrating a configuration of a fourth embodiment of the light pickup according to the present invention.

Now, a fourth embodiment of the present invention will be described with reference to FIG. 9. FIG. 9 shows a configuration of a light pickup according to the fourth embodiment of the present invention. In FIG. 9, the reference numerals 4 and 8 represent optical units, the reference numeral 10 designates a beam splitter and the reference numeral 16 denotes an objective lens. Since these components are configured and arranged similarly to those used in the first embodiment, they will be designated by the same reference numerals and not be described in detail.

Differently from the first embodiment, the fourth embodiment comprises a collimator lens 14 and a wavelength filter 15. Since the collimator lens 14 has been described with reference to the third embodiment and the wavelength filter 15 has been described with reference to the second embodiment, these members are designated by the same reference numerals and not described in detail.

As described with reference to the second embodiment, the wavelength filter 15 is disposed on a ray outgoing surface of the beam splitter 10. Further, the collimator lens 14 has a focal length in the range of 11 to 18 mm and a numerical aperture in the range of 0.1 to 0.14 for high density optical disks, and is disposed between the wavelength filter 15 and the objective lens 16. The collimator lens 14 and light sources are disposed in such a positional relationship that a light source 2 is disposed at a distance of a focal length of the collimator lens 14 and a light source 6 is disposed at a distance shorter than the focal length of the collimator lens 14. In other words, the optical units 4 and 8 are disposed so as to satisfy the relationship of L1>L2 where a distance as measured from the light source of the optical unit 4 to the collimator lens 14 is designated by L1 and a distance as measured from the light source of the optical unit 8 to the collimator lens 14 is designated by L2.

As a result, the wavelength filter 15 functions as a stop which controls a diameter of a light bundle, rays emitted from the light source 2 are made parallel after transmitting through the collimator lens 14 and rays emitted from the light source 6 are reduced in divergent angles after transmitting through the collimator lens 14 as described above.

Figure 10:
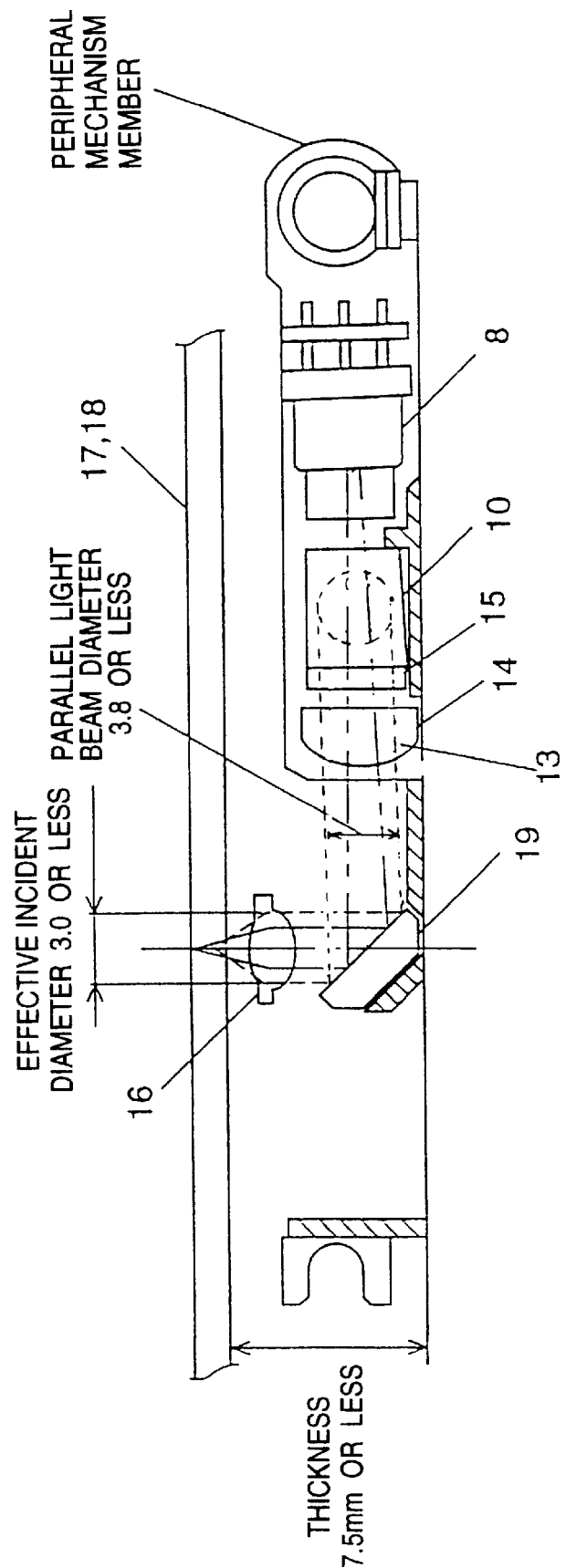
FIG. 10 is a sectional view taken along a X—X line in FIG. 9.
Figure 11A:
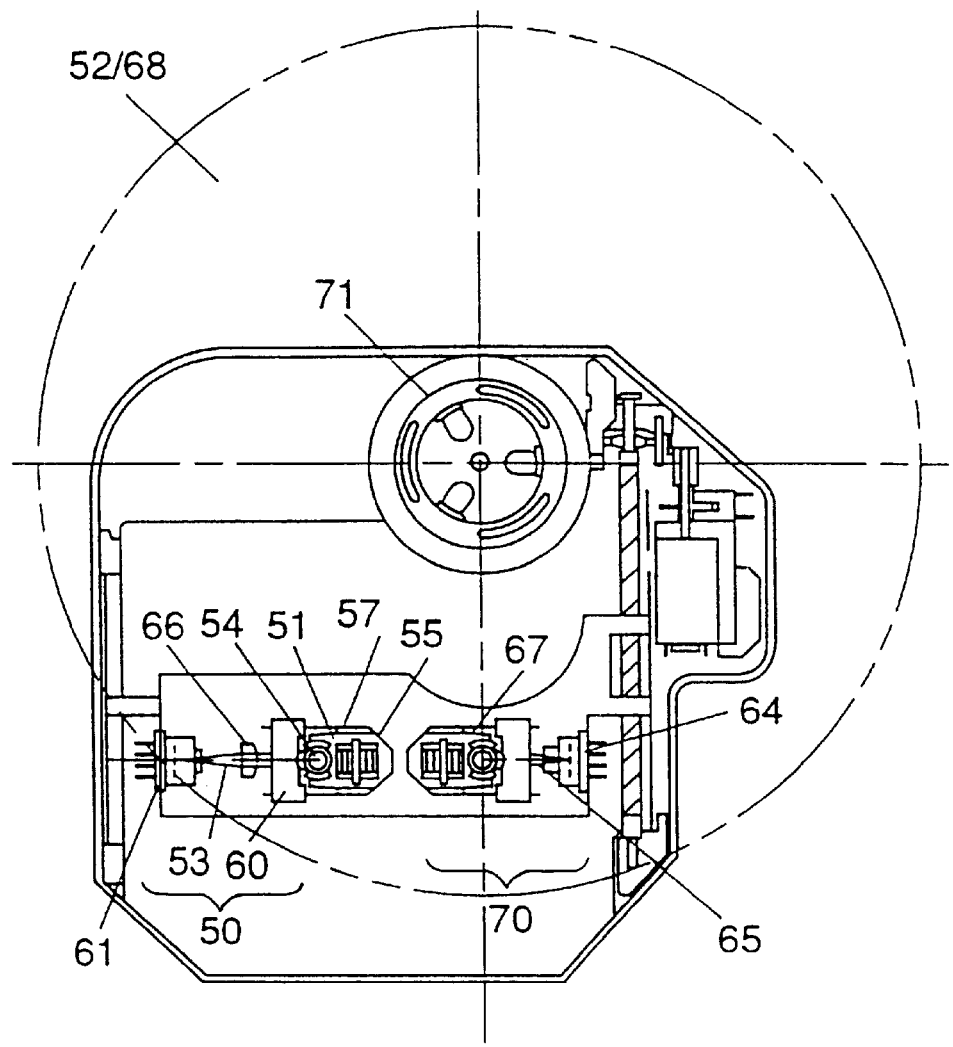
FIGS. 11A and 11B are a plan view of a conventional light pickup and a sectional view showing main parts thereof.
Figure 11B:
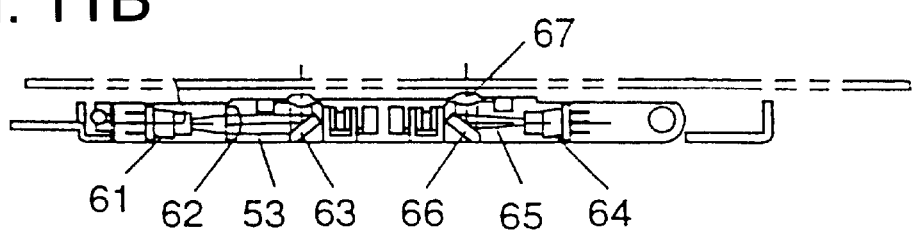

FIG. 10 is a sectional view taken along a X—X line in FIG. 9. In FIG. 10, a light beam 13 outgoing from the optical unit 8 toward a CD is restricted in diameter by the wavelength filter 15 and reduced in divergent angle by the collimator lens 14 (indicated by two-dot chain lines in the drawing). A light beam outgoing from the optical unit 4 (not shown) toward a DVD, on the other hand, is converted by the collimator lens 14 from a divergent light beam into a parallel light beam (indicated by dashed lines in the drawing). Each of the light beams is reflected by an erecting mirror 19 to be incident on the objective lens 16.

As described with reference to the first embodiment, the objective lens 16 is set to have a focal length of 2.5 mm or less and a working distance of 1.2 mm or less for a high density optical disk. Further, the optical units 4 and 8 are disposed so as to satisfy the relationship of L1>L2 as described with reference to the third embodiment. Since rays emitted from the light source 2 or the light source 6 are converted by the collimator lens 14 into rays parallel with one another or rays of reduced divergent angles, a parallel light beam 13 having transmitted through the collimator lens 14 toward the DVD has a maximum diameter in the arrangement described above. For the sake of finishing an entire light pickup system to a desired size and thickness, an effective diameter of incidence of a light bundle which transmits through the objective lens 16 is set at 3.0 mm or less and a diameter of a parallel light bundle which has just transmitted through the collimator lens 14 is set at 3.8 mm or less also in the fourth embodiment (a finite optical system). As a result, the fourth embodiment permits specifying a thickness of the entire system including peripheral mechanical members for supporting the optical elements described above, thereby making it possible to constitute the entire system with a thickness of 7.5 mm or less as measured from a bottom surface of a high density optical disk 17.

The configuration described as the fourth embodiment is not limiting. For example, the locations of the collimator lens 14 and the wavelength filter 15 may be exchanged with each other, and the wavelength filter 15 in an optical path may be disposed between the collimator lens 14 and the objective lens. Further, a stop member (not shown) may be disposed between the optical unit 8 and the beam splitter 10 in place of the wavelength filter 15, and an aperture of a stop member may be formed to operate the objective lens 16 within a range of numerical apertures (NAs) from 0.4 to 0.6 for rays from the light source 6. Furthermore, the locations of the optical unit 4 and the optical unit 8 may be exchanged with each other.

While the fourth embodiment uses the light source which emits rays having a wavelength in the vicinities of 650 nm for reproducing information from the high density optical disk and the light source which emits rays having a wavelength in the vicinities of 780 nm for reproducing information from the low density optical disk, the present invention is not limited to this embodiment. For example, a light source of 650 nm may be used for the low density optical disk and a light source of 400 nm may be used for the high density optical disk.

Now, description will be made of another example of the objective lens 16 which has different characteristics. In each of the first through fourth embodiments described above, the objective lens is usable commonly for recording and reproducing information from the high density optical disk and the low density optical disk, and has a numerical aperture of 0.6, a focal length of 2.5 mm or less and a working distance of 1.2 mm or less for the rays having the short wavelengths for the high density optical disk.

When an objective lens is made thin with geometric and optical conditions unchanged, however, a working distance is increased a distance corresponding to the reduced thickness. It is therefore possible to make the objective lens thin with geometric and optical conditions unchanged by appropriately selecting a material and a thickness of the objective lens on the basis of the facts that the rays having the short wavelengths for the high density optical disk use the entire circumference of the objective lens to be focused on the recording layer at the depth of 0.6 mm as measured from the bottom surface of the optical disk in the condition of NA of 0.6 and that the rays having long wavelengths for the low density optical disk use the central portion of the objective lens to be focused on a recording layer at the depth of 1.2 mm as measured from the bottom surface of the optical disk in the condition of NA of 0.45.

As a result, it is possible to set a working distance of 1.4 mm or less for the rays having the short wavelengths and a working distance of 1.2 mm or less for the rays having the long wavelengths. When the working distances are increased, the objective lens is prevented from being brought into contact with the bottom surface of the optical disk in abnormal conditions such as a variation of a disk surface due to warp or twist and a focus control error, whereby it is possible to provide a light pickup which is small-sized, thin and easily controllable.

What is claimed is:

1. A light pickup for reproducing information from an optical disk recording medium, said pickup comprising:
   a first light source for emitting light of a first wavelength;
   a first photodetector for detecting light reflected from the optical disk;
   a second light source for emitting light having a second wavelength, said first wavelength being shorter than said second wavelength;
   a second photodetector for detecting light reflected from the optical disk;
   light splitting means for guiding the light having the first wavelength and the light having the second wavelength to generally a same optical axis; and
   an objective lens, wherein:
   an optical axis of said first light source intersects said same optical axis,
   an optical axis of said second light source is disposed on a line of extension of said same optical axis,
   the following relationship is established:
   L1>L2
   where L1 represents an optical distance from said first light source to said objective lens, and L2 represents an optical distance from said second light source to said objective lens, and
   said objective lens has a numerical aperture of 0.6 or more and a focal length of 2.5 mm or less for the light having the first wavelength.

2. A light pickup according to claim 1, wherein said objective lens has a working distance of 1.2 mm or less.

3. A light pickup according to claim 1, wherein said objective lens has a working distance of 1.4 mm or less for the light having the first wavelength and a working distance of 1.2 mm or less for said rays having the second wavelength.

4. An optical disk apparatus having a light pickup as set forth in claim 1, in which an overall thickness of said optical disk apparatus is equal to or less than 12.7 mm.

5. A light pickup for reproducing information from an optical disk recording medium, said pickup comprising:
   a first light source for emitting light of a first wavelength;
   a first photodetector for detecting light reflected from the optical disk;
   a second light source for emitting light having a second wavelength, said first wavelength being shorter than said second wavelength;
   a second photodetector for detecting light reflected from the optical disk;
   light splitting means for guiding the light having the first wavelength and the light having the second wavelength to generally a same optical axis; and
   an objective lens for focusing the light having the first wavelength and the light having the second wavelength onto the optical disk, wherein:
   an optical axis of said first light source intersects said same optical axis,
   an optical axis of said second light source is disposed on a line of extension of said same optical axis,
   the following relationship is established:
   L1>L2
   where L1 represents an optical distance from said first light source to said objective lens, and L2 represents an optical distance from said second light source to said objective lens, and
   said objective lens has an effective diameter of incidence of 3.0 mm or less, a numerical aperture of 0.6 or more and a focal length of 2.5 mm or less for the light having the first wavelength.

6. A light pickup according to claim 5, wherein said objective lens has a working distance of 1.2 mm or less.

7. A light pickup according to claim 5 wherein said objective lens has a working distance of 1.4 mm or less for the light having the firs wavelength and a working distance of 1.2 mm or less for the light having the second wavelength.

8. An optical disk apparatus having a light pickup as set forth in claim 5, in which an overall thickness of said optical disk apparatus is equal to or less than 12.7 mm.

9. A light pickup for reproducing information from an optical disk recording medium, said pickup comprising:

a first light source for emitting light of a first wavelength;

a first photodetector for detecting light reflected from the optical disk;

a second light source for emitting light having a second wavelength, said first wavelength being shorter than said second wavelength;

a second photodetector for detecting light reflected from the optical disk;

light splitting means for guiding the light having the first wavelength and the light having the second wavelength to generally a same optical axis;

beam diameter change means having different transmitting beam diameters for the light having the first wavelength and the light having the second wavelength, respectively; and an objective lens for focusing the light having the first wavelength and the light having the second wavelength onto the optical disk, wherein:

an optical axis of said first light source intersects said same optical axis, an optical axis of said second light source is disposed on a line of extension of said same optical axis, the following relationship is established:

L1>L2 where L1 represents an optical distance from said first light source to said objective lens, and L2 represents an optical distance from said second light source to said objective lens, and said objective lens has an effective diameter of incidence of 3.0 mm or less, a numerical aperture of 0.6 or more and a focal length of 2.5 mm or less for the light having the first wavelength.

10. A light pickup according to claim 9, wherein said objective lens has a working distance of 1.2 mm or less.

11. A light pickup according to claim 9, wherein said objective lens has a working distance of 1.4 mm or less for the light having the first wavelength and a working distance of 1.2 mm or less for the light having the second wavelength.

12. An optical disk apparatus having a light pickup as set forth in claim. 9, in which an overall thickness of said optical disk apparatus is equal to or less than 12.7 mm.

13. A light pickup for reproducing information from an optical disk recording medium, said pickup comprising:

a first light source for emitting light of a first wavelength;

a first photodetector for detecting light reflected from the optical disk;

a second light source for emitting light having a second wavelength, said first wavelength being shorter than said second wavelength;

a second photodetector for detecting light reflected from the optical disk;

light splitting means for guiding the light having the first wavelength and the light having the second wavelength to generally a same optical axis;

a collimator lens for converting the light having the first wavelength from divergent light beams into parallel light beams for reducing an angle of divergence of the light having the second wavelength; and an objective lens for focusing the light having the first wavelength and the light having the second wavelength onto the optical disk, wherein:

an optical axis of said first light source intersects said same optical axis, an optical axis of said second light source is disposed on a line of extension of said same optical axis, the following relationship is established:

L1>L2 where L1 represents an optical distance from said first light source to said collimator lens, and L2 represents an optical distance from said second light source to said collimator lens, said objective lens has a numerical aperture of 0.6 or more and a focal length of 2.5 mm or less for the light having the first wavelength, parallel light beams having transmitted through said collimator lens have a diameter of 3.8 mm or less, and said objective lens has an effective diameter of incidence of 3.0 mm or less.

14. A light pickup according to claim 13, wherein said collimator lens has a numerical aperture of 0.1 to 0.14 and a focal length in the range of 11 mm to 18 mm for said rays having the first wavelength.

15. A light pickup according to claim 13, wherein said objective lens has a working distance of 1.2 mm or less.

16. A light pickup according to claim 13, wherein said objective lens has a working distance of 1.4 mm or less for the light having the first wavelength and a working distance of 1.2 mm or less for the light having the second wavelength.

17. An optical disk apparatus having a light pickup as set forth in claim 13, in which an overall thickness of said optical disk apparatus is equal to or less than 12.7 mm.

18. A light pickup for reproducing information from an optical disk recording medium, said pickup comprising:

a first optical unit including a first light source for emitting light having a first wavelength and a first photodetector for detecting light reflected from the optical disk;

a second optical unit including a second light source for emitting light having a second wavelength and a second photodetector for detecting light reflected from the optical disk, said first wavelength being shorter than said second wavelength;

light splitting means for guiding the light having the first wavelength and the light having the second wavelength to generally a same optical axis; and an objective lens for focusing the light having the first wavelength and the light having the second wavelength onto the optical disk, wherein:

an optical axis of said first light source intersects said same optical axis, an optical axis of said second light source is disposed on a line of extension of said same optical axis, the following relationship is established:

L1>L2 where L1 represents an optical distance from said first light source to said objective lens, and L2 represents an optical distance from said second light source to said objective lens, said objective lens has a working distance of 1.2 mm or less, an effective diameter of incidence of 3.0 mm or less, a numerical aperture of 0.6 or more and a focal length of 2.5 mm or less for the light having the first wavelength, and said light pickup as has an overall thickness of 7.5 mm or less as measured from a bottom surface of the optical disk.

19. An optical disk apparatus having a light pickup as set forth in claim 18, in which an overall thickness of said optical disk apparatus is equal to or less than 12.7 mm.

20. A light pickup for reproducing information from an optical disk recording medium, said pickup comprising:

a first optical unit including a first light source for emitting light having a first wavelength and a first photodetector for detecting light reflected from the optical disk;

a second optical unit including a second light source for emitting light having a second wavelength and a second photodetector for detecting light reflected from the optical disk, said first wavelength being shorter than said second wavelength;

light splitting means for guiding the light having the first wavelength and the light having the second wavelength to generally a same optical axis; and an objective lens for focusing the light having the first wavelength and the light having the second wavelength onto the optical disk, wherein:

an optical axis of said first light source intersects said same optical axis, an optical axis of said second light source is disposed on a line of extension of said same optical axis, the following relationship is established:

L1>L2 where L1 represents an optical distance from said first light source to said objective lens, and L2 represents an optical distance from said second light source to said objective lens, said objective lens has a working distance of 1.4 mm or less for the light having the first wavelength, a working distance of 1.2 mm or less for the light having the second wavelength, an effective diameter of incidence of 3.0 mm or less, a numerical aperture of 0.6 or more and a focal length of 2.5 mm or less for the light having the first wavelength, and said light pickup has an overall thickness of 7.5 mm or less as measured from a bottom surface of the optical disk.

21. An optical disk apparatus having a light pickup as set forth in claim 20, in which an overall thickness of said optical disk apparatus is equal to or less than 12.7 mm.

22. A light pickup for reproducing information from an optical disk recording medium, said pickup comprising:

a first optical unit including a first light source for emitting light having a first wavelength and a first photodetector for detecting light reflected from the optical disk;

a second optical unit including a second light source for emitting light having a second wavelength and a second photodetector for detecting light reflected from the optical disk, said first wavelength being shorter than said second wavelength;

light splitting means for guiding the light having the first wavelength and the light having the second wavelength to generally a same optical axis;

beam diameter change means having different transmitting beam diameters for the light having the first wavelength and the light having the second wavelength, respectively; and an objective lens for focusing the light having the first wavelength and the light having the second wavelength onto the optical disk, wherein:

an optical axis of said first light source intersects said same optical axis, an optical axis of said second light source is disposed on a line of extension of said same optical axis, the following relationship is established:

L1>L2 where L1 represents an optical distance from said first light source to said objective lens, and L2 represents an optical distance from said second light source to said objective lens, said objective lens has a working distance of 1.2 mm or less, an effective diameter of incidence of 3.0 mm or less, a numerical aperture of 0.6 or more and a focal length of 2.5 mm or less for the light having the first wavelength, and said light pickup has an overall thickness of 7.5 mm or less as measured from a bottom surface of the optical disk.

23. An optical disk apparatus having a light pickup as set forth in claim 22, in which an overall thickness of said optical disk apparatus is equal to or less than 12.7 mm.

24. A light pickup for reproducing information from an optical disk recording medium, said pickup comprising:

a first optical unit including a first light source for emitting light having a first wavelength and a first photodetector for detecting light reflected from the optical disk;

a second optical unit including a second light source for emitting light having a second wavelength and a second photodetector for detecting light reflected from the optical disk, said first wavelength being shorter than said second wavelength;

light splitting means for guiding the light having the first wavelength and the light having the second wavelength to generally a same optical axis, beam diameter change means having different transmitting beam diameters for the light having the first wavelength and the light having the second wavelength, respectively; and an objective lens for focusing the light having the first wavelength and the light having the second wavelength onto the optical disk, wherein:

an optical axis of said first light source intersects said same optical axis, an optical axis of said second light source is disposed on a line of extension of said same optical axis, the following relationship is established:

L1>L2 where L1 represents an optical distance from said first light source to said objective lens, and L2 represents an optical distance from said second light source to said objective lens, said objective lens has a working distance of 1.4 mm or less for the light having the first wavelength, a working distance of 1.2 mm or less for the light having the second wavelength, an effective diameter of incidence of 3.0 mm or less, a numerical aperture of 0.6 or more and a focal length of 2.5 mm or less for the light having the first wavelength, and said light pickup has an overall thickness of 7.5 mm or less as measured from a bottom surface of the optical disk.

25. An optical disk apparatus having a light pickup as set forth in claim 24, in which an overall thickness of said optical disk apparatus is equal to or less than 12.7 mm.

26. A light pickup for reproducing information from an optical disk recording medium, said pickup comprising:

a first optical unit including a first light source for emitting light having a first wavelength and a first photodetector for detecting light reflected from the optical disk;

a second optical unit including a second light source for emitting light having a second wavelength and a second photodetector for detecting light reflected from the optical disk, said first wavelength being shorter than said second wavelength;

light splitting means for guiding the light having the first wavelength and the light having the second wavelength to generally a same optical axis, a collimator lens for converting the light having the first wavelength from divergent light beams into parallel light beams for reducing an angle of divergence of the light having the second wavelength; and an objective lens for focusing the light having the first wavelength and the light having the second wavelength onto the optical disk, wherein:

an optical axis of said first light source intersects said same optical axis, an optical axis of said second light source is disposed on a line of extension of said same optical axis, the following relationship is established:
L1>L2 where L1 represents an optical distance from said first light source to said collimator lens, and L2 represents an optical distance from said second light source to said collimator lens, said collimator lens has a numerical aperture of 0.1 to 0.14 and a focal length in the range of 11 mm to 18 mm for the light having the first wavelength;

said objective lens has a working distance of 1.2 mm or less, an effective diameter of incidence of 3.0 mm or less, a numerical aperture of 0.6 or more and a focal length of 2.5 mm or less for the light having the first wavelength, parallel light beams having transmitted through said collimator lens have a diameter of 3.8 mm or less, and said light pickup has an overall thickness of 7.5 mm or less as measured from a bottom surface of the optical disk.

27. An optical disk apparatus having a light pickup as set forth in claim 26, in which an overall thickness of said optical disk apparatus is equal to or less than 12.7 mm.

28. A light pickup for reproducing information from an optical disk recording medium, said pickup comprising:

a first optical unit including a first light source for emitting light having a first wavelength and a first photodetector for detecting light reflected from the optical disk;

a second optical unit including a second light source for emitting light having a second wavelength and a second photodetector for detecting light reflected from the optical disk, said first wavelength being shorter than said second wavelength;

light splitting means for guiding the light having the first wavelength and the light having the second wavelength to generally a same optical axis;

a collimator lens for converting the light having the first wavelength from divergent light beams into parallel light beams for reducing an angle of divergence of the light having the second wavelength; and an objective lens for focusing the light having the first wavelength and the light having the second wavelength onto the optical disk, wherein:

an optical axis of said first light source intersects said same optical axis, an optical axis of said second light source is disposed on a line of extension of said same optical axis, the following relationship is established:
L1>L2 where L1 represents an optical distance from said first light source to said collimator lens, and L2 represents an optical distance from said second light source to said collimator lens, said collimator lens has a numerical aperture of 0.1 to 0.14 and a focal length in the range of 11 mm to 18 mm for the light having the first wavelength;

said objective lens has a working distance of 1.4 mm or less for the light having the first wavelength, a working distance of 1.2 mm or less for the light having the second wavelength, an effective diameter of incidence of 3.0 mm or less, a numerical aperture of 0.6 or more and a focal length of 2.5 mm or less for the light having the first wavelength, parallel light beams having transmitted through said collimator lens have a diameter of 3.8 mm or less, and said light pickup has an overall thickness of 7.5 mm or less as measured from a bottom surface of the optical disk.

29. An optical disk apparatus having a light pickup as set forth in claim 28, in which an overall thickness of said optical disk apparatus is equal to or less than 12.7 mm.

30. A light pickup for reproducing information from an optical disk recording medium, said pickup comprising:

a first optical unit including a first light source for emitting light having a first wavelength and a first photodetector for detecting light reflected from the optical disk;

a second optical unit including a second light source for emitting light having a second wavelength and a second photodetector for detecting light reflected from the optical disk, said first wavelength being shorter than said second wavelength;

light splitting means for guiding the light having the first wavelength and the light having the second wavelength to generally a same optical axis;

beam diameter change means having different transmitting beam diameters for the light having the first wavelength and the light having the second wavelength, respectively;

a collimator lens for converting the light having the first wavelength from divergent light beams into parallel light beams for reducing an angle of divergence of the light having the second wavelength; and an objective lens for focusing the light having the first wavelength and the light having the second wavelength onto the optical disk, wherein:

an optical axis of said first light source intersects said same optical axis, an optical axis of said second light source is disposed on a line of extension of said same optical axis, the following relationship is established:
L1>L2 where L1 represents an optical distance from said first light source to said collimator lens, and L2 represents an optical distance from said second light source to said collimator lens, said collimator lens has a numerical aperture of 0.1 to 0.14 and a focal length in the range of 11 mm to 18 mm for the light having the first wavelength, said objective lens has a working distance of 1.2 mm or less, an effective diameter of incidence of 3.0 mm or less, a numerical aperture of 0.6 or more and a focal length of 2.5 mm or less for the light having the first wavelength, parallel light beams having transmitted through said collimator lens have a diameter of 3.8 mm or less, and said light pickup has an overall thickness of 7.5 mm or less as measured from a bottom surface of the optical disk.

31. An optical disk apparatus having a light pickup as set forth in claim 30, in which an overall thickness of said optical disk apparatus is equal to or less than 12.7 mm.

32. A light pickup for reproducing information from an optical disk recording medium, said pickup comprising:

a first optical unit including a first light source for emitting light having a first wavelength and a first photodetector for detecting light reflected from the optical disk;

a second optical unit including a second light source for emitting light having a second wavelength and a second photodetector for detecting light reflected from the optical disk, said first wavelength being shorter than said second wavelength;

light splitting means for guiding the light having the first wavelength and the light having the second wavelength to generally a same optical axis, beam diameter change means having different transmitting beam diameters for the light having the first wavelength and the light having the second wavelength, respectively;

a collimator lens for converting the light having the first wavelength from divergent light beams into parallel light beams for reducing an angle of divergence of the light having the second wavelength; and an objective lens for focusing the light having the first wavelength and the light having the second wavelength onto the optical disk, wherein:

an optical axis of said first light source intersects said same optical axis, an optical axis of said second light source is disposed on a line of extension of said same optical axis, the following relationship is established:

L1>L2 where L1 represents an optical distance from said first light source to said collimator lens, and L2 represents an optical distance from said second light source to said collimator lens, said collimator lens has a numerical aperture of 0.1 to 0.14 and a focal length in the range of 11 mm to 18 mm for the light having the first wavelength, said objective lens has a working distance of 1.4 mm or less for the light having the first wavelength, a working distance of 1.2 mm or less for the light having the second wavelength, an effective diameter of incidence of 3.0 mm or less, a numerical aperture of 0.6 or more and a focal length of 2.5 mm or less for the light having the first wavelength, parallel light beams having transmitted through said collimator lens have a diameter of 3.8 mm or less, and said light pickup has an overall thickness of 7.5 mm or less as measured from a bottom surface of the optical disk.

33. An optical disk apparatus having a light pickup as set forth in claim 32, in which an overall thickness of said optical disk apparatus is equal to or less than 12.7 mm.

* * * * *